(12) United States Patent
Trojer et al.

(10) Patent No.: US 8,897,639 B2
(45) Date of Patent: Nov. 25, 2014

(54) METHODS AND SYSTEMS FOR INCREASING REACH AND/OR SPLIT IN PASSIVE OPTICAL NETWORKS

(75) Inventors: Elmar Trojer, Täby (SE); Stefan Dahlfort, Täby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1206 days.

(21) Appl. No.: 12/744,737

(22) PCT Filed: Nov. 27, 2007

(86) PCT No.: PCT/IB2007/003642
§ 371 (c)(1),
(2), (4) Date: Oct. 25, 2011

(87) PCT Pub. No.: WO2009/068929
PCT Pub. Date: Jun. 4, 2009

(65) Prior Publication Data
US 2012/0033973 A1 Feb. 9, 2012

(51) Int. Cl.
*H04B 10/08* (2006.01)
*H04J 14/02* (2006.01)

(52) U.S. Cl.
CPC .................. *H04J 14/0282* (2013.01)
USPC .................. 398/38; 398/25; 398/37; 398/58; 398/61; 398/63; 398/66; 398/94; 398/158; 398/160; 398/210

(58) Field of Classification Search
CPC .............. H04B 10/25; H04B 10/2507
USPC .................. 398/25, 38, 58–75, 94, 158–160, 398/208–210, 212, 213
See application file for complete search history.

(56) References Cited

U.S. PATENT DOCUMENTS

| | | | |
|---|---|---|---|
| 6,636,657 B1 | 10/2003 | Aksyuk et al. | |
| 6,961,524 B1 | 11/2005 | Foo | |
| 7,280,762 B1 | 10/2007 | Haggans et al. | |
| 7,492,378 B2 * | 2/2009 | Nishino et al. | 345/694 |
| 7,606,490 B2 * | 10/2009 | Dalton et al. | 398/71 |
| 7,889,815 B2 * | 2/2011 | Miremadi et al. | 375/317 |
| 8,107,819 B2 * | 1/2012 | Yang et al. | 398/98 |
| 8,270,837 B2 * | 9/2012 | Yeh et al. | 398/98 |
| 2003/0152116 A1 | 8/2003 | Liao et al. | |
| 2004/0114211 A1 | 6/2004 | Trepagnier et al. | |
| 2004/0131239 A1 | 7/2004 | Shahar | |
| 2004/0136053 A1 | 7/2004 | Sugiya | |
| 2004/0247246 A1 * | 12/2004 | Lee et al. | 385/48 |
| 2006/0245687 A1 | 11/2006 | Gall et al. | |

FOREIGN PATENT DOCUMENTS

| | | |
|---|---|---|
| EP | 0 989 437 A | 3/2000 |
| EP | 1 089 477 A | 4/2001 |
| EP | 1 473 962 A | 11/2004 |
| WO | WO 96/20545 A | 7/1996 |
| WO | WO 00/24148 A | 4/2000 |

OTHER PUBLICATIONS

Borella, et al. Optical Components for WDM Lightwave Networks. Proceeding of the IEEE, vol. 85 No. 8. Aug. 1, 1997.

* cited by examiner

*Primary Examiner* — Li Liu

(57) ABSTRACT

Systems and methods according to these exemplary embodiments provide for methods and systems that allow for either reducing signal loss or improving the optical signal strength in a PON for increasing optical signal range.

8 Claims, 18 Drawing Sheets

METHODS AND SYSTEMS FOR INCREASING REACH AND/OR SPLIT IN PASSIVE OPTICAL NETWORKS

TECHNICAL FIELD

The present invention relates generally to telecommunications systems and in particular to methods and systems for increasing reach/split in passive optical networks.

BACKGROUND

Communications technologies and uses have greatly changed over the last few decades. In the fairly recent past, copper wire technologies were the primary mechanism used for transmitting voice communications over long distances. As computers were introduced the desire to exchange data between remote sites became desirable for many purposes such as those of businesses, individual users and educational institutions. The introduction of cable television provided additional options for increasing communications and data delivery from businesses to the public. As technology continued to move forward, digital subscriber line (DSL) transmission equipment was introduced which allowed for faster data transmissions over the existing copper phone wire infrastructure. Additionally, two way exchanges of information over the cable infrastructure became available to businesses and the public. These advances have promoted growth in service options available for use, which in turn increases the need to continue to improve the available bandwidth for delivering these services, particularly as the quality of video and overall amount of content available for delivery increases.

One promising technology that has been introduced is the use of optical fibers for telecommunication purposes. Optical fiber network standards, such as synchronous optical networks (SONET) and the synchronous digital hierarchy (SDH) over optical transport (OTN), have been in existence since the 1980s and allow for the possibility to use the high capacity and low attenuation of optical fibers for long haul transport of aggregated network traffic. These standards have been improved upon and today, using OC-768/STM-256 (versions of the SONET and SDH standards respectively), a line rate of 40 gigabits/second is achievable using dense wave division multiplexing (DWDM) on standard optical fibers.

In the access domain, information regarding optical networking can be found in Ethernet in the First Mile (EFM) standards (IEEE 802.3ah which can be found at www.ieee802.org and is included herein by reference) supporting data transport over point-to-point (p2p) and point-to-multipoint (p2mp) optical fiber based access network structures. Additionally the International Telecommunications Union (ITU) has standards for p2mp relating to the use of optical access networking. Networks of particular interest for this specification are passive optical networks (PONs). For example, three PONs of interest are, e.g., Ethernet PONs (EPONs), broadband PONs (BPONs) and gigabit capable PONs (GPONs), which are displayed below for comparison in Table 1.

TABLE 1

Major PON Technologies and Properties

| Characteristics | EPON | BPON | GPON |
|---|---|---|---|
| Standard Protocol | IEEE 802.3ah Ethernet | ITU-T G.983 ATM | ITU-T G.984 Ethernet |

TABLE 1-continued

Major PON Technologies and Properties

| Characteristics | EPON | BPON | GPON |
|---|---|---|---|
| Rates (Mbps) | 1244 up/1244 down | 622/1244 down 155/622 up | 1244/2488 down 155 to 2488 up |
| Span (Km) | 10 | 20 | 20 |
| Number of Splits | 16 | 32 | 64 |

An exemplary GPON 100 in FIG. 1 shows elements of an optical distribution network (ODN) that interact with various endpoints of an optical network termination (ONT). Additionally GPON 100 uses wave division multiplexing (WDM) on the optical signals. As shown in FIG. 1, one or more service providers or types 102 can be in communication with an optical line termination (OLT) 104, which is typically located in a central office (CO) (not shown). The OLT 104 provides the network side interface and is typically in communication with at least one optical network termination (ONT) (or an optical network unit (ONU) which performs similar duties as an ONT but typically for a multi-dwelling unit). These service providers 102 can provide a variety of services such as video-on-demand or high definition television (HDTV), Voice over IP (VoIP) and high speed internet access (HSIA). The OLT 104 transmits information to WDM 106 which multiplexes the data and transmits the data optically to a passive combiner/splitter 108. The passive combiner/splitter 108 then splits the signal and transmits it to the upstream WDMs 110 and 116. These WDMs 110 and 116 demultiplex the signal and forward it on to their respective ONTs 112 and 118. These WDMs (108, 110 and 116) are typically integrated into both the OLT and the ONTs and are used for placing and extracting the upstream and downstream wavelengths depending upon their locations in the optical network. These ONTs 112 and 118 then forward the information onto their respective end users (EU) 114, 120 and 122.

It will be understood by those skilled in the art that this purely illustrative GPON 100 can be implemented in various ways, e.g., with modifications where different functions are combined or performed in a different manner. For example these WDMs (108, 110 and 116) typically are duplexers, but if an additional signal is being transmitted, e.g., a cable-television signal in a GPON, they can act as triplexers. Additionally in the upstream direction, the optical signal would typically have a different wavelength from the downstream signal and use the same WDMs 106, 110 and 116, which have bidirectional capabilities.

With the advent of the above described services and the ongoing improvements in optical networks, many telecommunication companies are choosing to upgrade their copper centric access networks with fiber optic access networks. Some such upgrades include, for example, using one of the above described PON networks combined with fiber to the home (FTTH), and/or hybrid networks, e.g., fiber to the cabinet (FTTC) combining optical EFM and/or PON for data backhaul with very high speed digital subscriber line (VDSL2) by reusing the last hundred meters or so of copper wire. These upgrades allow an increase in the types and quality of services delivered by companies to end users. A comparison of two different types of optical distributions networks (ODNs) are summarized below in Table 2.

TABLE 2

P2P vs. P2PM

| P2P | P2PM (GPON) |
|---|---|
| Mature technology, low risk | New technology, higher risk |
| Favored by non-telcos in open network | Favored by T1 (closed network) |
| Main markets: Northern and Western Europe | Main markets: US and Southern Europe |
| Lowest CapEx today | Low OpEx today, higher price erosion |

Regardless of which type of optical system, i.e., p2p or GPON (or both), is deployed, one of the primary requirements for low capital expenditure (CapEx) and operational expenditure (OpEx) is for the optical system to employ a passive ODN, e.g., using only passive optical components between the central office (CO) and the user equipment (FTTH) or the cabinet (FTTC). Examples of the passive optical components include connectors, fibers, splices and passive power splitters (PPS). A downside to using only passive optical components is that the overall signal reach becomes reduced as a function of the number of splits in the system. For example, in a typical PON which is communicating with up to 64 end users, the effective usable signal strength distance is approximately 20 kilometers.

An acceptable amount of loss allowable attributable splitters (also referred to as "splitter insertion loss") in an ODN is specified by, for example, the G.984.2 specification for GPONs depending upon optical class. For more information regarding GPONs in general, the interested reader is directed to the G.984.1-4 standards which can be found at www.itu.int/rec/T-REC-G/en, the disclosure of which is incorporated herein by reference. Three general optical classes are class A optics (which allow for a loss between 5 to 20 dB), class B optics (which allow for a loss between 10 to 25 dB) and class C optics (which allow for a loss between 15 to 30 dB). A current industry standard used for GPONs is considered to be a B+ optics class which allows for a maximum loss of 28 dB over an ODN. In other words, the optical transceivers in an OLT and the ONT(s) should be able to perform to provide an acceptable output on an ODN where the passive components, e.g., splices, connectors, fibers and splitters, together have an insertion loss of 28 dB. This link budget also typically needs to take into account other power penalties and some amount of system margin.

Different passive components within an ODN provide different amounts of loss during transmission. Table 3 below shows typical ODN components and the associated loss.

TABLE 3

Typical ODN Components and Associated Losses

| Component | Average Loss | | Description |
|---|---|---|---|
| Single Mode Fiber | 0.4 dB/km @ 1310 nm | | G.652.B |
| | 0.25 dB/km @ 1550 nm | | |
| Connector/Splice | 0.1-0.2 dB | | LC/PC Type |
| Passive splitter/Combiner | 1 × 4 | 7.5 dB | Standard Grade Power Splitter |
| | 1 × 8 | 11 dB | |
| | 1 × 16 | 14.2 dB | |
| | 1 × 32 | 17.8 dB | |
| | 1 × 64 | 21.1 dB | |
| | 1 × 128 | 23.8 dB | |

As can be seen in Table 3, the splitter typically contributes the largest amount of loss in an ODN. For example, the loss associated with a splitting ratio of 1:64 (which is a commonly desired ratio today) is 21.1 dB, which roughly equates to the loss generated by passing an optical signal through a fiber with a length of 53 km (e.g., the fiber loss at the 1310 nm wavelength for transmissions over 53 km of single mode fiber). The fiber loss over that distance is shown in the equation below.

$$53 \text{ km} \times 0.4 \text{ dB/km} = 21.2 \text{ dB} \qquad (1)$$

Looking at the optical losses due to the splitters from another perspective using the data in Table 3 above, for a B+ system with a 28 dB link budget, a 1×64 splitter would reduce the reach (i.e., the useful transmit distance) of the PON to 18 km. Thus, even small reductions in the splitter insertion loss could result in appreciable increases in PON optical signal reach or possibly the number of splits while maintaining a similar reach. For example, a doubling of the split ratio implies a +3 dB increase in insertion loss which equates to approximately 7.5 km in reach.

Other link budget considerations also exist and should be addressed to extend the reach of a PON. One issue is that for EPONs and GPONs the upstream transmission structure typically has a shorter reach as compared to the reach in the downstream transmission direction. The cause for this difference is inherent to the time division multiplexing/time division multiple access (TDM/TDMA) protocol structure used on the PONS, as will be described in more detail below. The division between downlink and uplink is done via WDM where the downlink operates on a wavelength of 1490 nm with a bandwidth of 20 nm and the uplink operates on a wavelength of 1310 nm with a bandwidth of 100 nm. The data in the downlink is broadcasted to all ONTs in the PON using a TDM scheme where each of the ONTs takes data from its assigned timeslot in the downstream signal. The downstream optical signal is a continuous wave with equal power transmitted towards all ONTs. The optical terminal transceiver (OTRx) located in the OLT is shared by all ONTs and thus can contain high quality optics with a high output power.

In the upstream direction, a TDMA scheme (e.g., as shown in FIG. 2) is used where ONTs 202 and 206 are allowed to transmit data in granted time-slots on their optical wavelength (s). This means that ONTs 202, 206 transmit in a burst mode at their allotted time slots, as compared to a continuous power transmission in the downstream direction from the OLT 210. Since the ONTs 202, 206 are located at different distances from the OLT 210, the ONTs 202, 206 are informed by the OLT 210 when, and with what power, to transmit their respective bursts so that the ONTs signals are arriving in an aligned time structure at the OLT 210. For example, ONT1 202 receives the continuous transmission 212 and receives its information from its assigned time slot 204. ONT2 206 performs similar functions and receives its information from timeslot 208. Based on the received data the ONTs know their transmission time slot which results in an upstream message 214 where the different ONT outputs are in a time sequential order.

Given this TDMA approach, the OLT 210 typically includes a burst receiver that decodes the ONTs data which arrives slightly jittered (or asynchronous) with differing power levels. At higher data rates of transmission this decoding process becomes more challenging to perform. For example, currently systems operating at transmission rates of 1.25 Gbit/s are considered to be cost efficient, transmission rates on the order of 2.5 Gbit/s are considered to be technically feasible, while transmission rates of 5-10 Gbit/s are not currently considered feasible in this type of optical communication system. This leads GPONs to have an asymmetric data rate. The use of a burst receiver introduces a burst penalty in the area of 3-6 dB depending upon the quality of the components in the OTRx. Coupling this burst penalty with a slightly higher loss on the upstream band (approximately 0.15 dB/km) and the need to use less expensive optical components (diplexer, triplexer) in the ONTs due to scalability reasons, transmission in the upstream direction becomes the limiting direction for this type of optical system.

To overcome this challenge of obtaining a greater transmit distance with a usable optical signal, while also maintaining a high number of allowable splits, different possible solutions can be considered. Generally, either the losses introduced by the splitters need to be reduced, the signal needs to be amplified or both. Regarding the possible solution of amplification, a variety of options exist as illustrated generally in FIG. 3. Therein, three potential locations for adding a booster for amplification are the CO 302, a remote node 304, or with each ONT 310 and 312 at a location such as home1 306 and home2 308. The booster in the CO 302 is shown as booster 314 near the OLT 316, the booster in the remote node 304 is shown as booster 318 downstream of the passive combiner splitter 320 and in the homes (or near the ONTs) the boosters are shown as boosters 322. Putting a booster or amplifier in any of these locations brings with it different, associated problems. For example, it would be cost prohibitive for a booster 322 to be located with each ONT 310 and 312 due to the high numbers of ONTs in a system. If a booster 318 were to be put in a remote node 304, it would add a need for power and perhaps more maintenance visits, to an otherwise passive location. Regarding placing a booster 314 in the CO 302 near the OLT 316, this also is not unproblematic since the booster 314 can only be operated in a low power mode due to non-linearities on the fiber. Moreover, since a typical GPON system is upstream limited and the input sensitivity of a pre-amplifier in the OLT booster 314 is approximately −28 dBm, this solution would be an added expense with no value for the upstream signal.

Accordingly the exemplary embodiments described herein provide systems and methods that allow, e.g., for either reducing signal loss or improving the optical signal strength in a PON.

SUMMARY

Systems and methods according to the present invention address this need and others by reducing signal loss or improving the optical signal strength in a passive optical network (PON).

According to one exemplary embodiment a method for optical communications includes the steps of: receiving a plurality of optical signals; coupling the plurality of optical signals at a light switching unit by switching between the plurality of optical signals into a sequentially combined signal onto an output fiber; and transmitting the combined signal, According to another exemplary embodiment a method for equalizing optical signals includes the steps of: receiving schedule information for each of a plurality of optical signals, wherein the schedule information includes at least timing and power information associated with the plurality of optical signals; and adjusting each of the optical signals by either amplifying or attenuating each of the plurality of optical signals based on the schedule information.

According to another exemplary embodiment a method for optical communications including the steps of receiving, at an optical line termination, a plurality of optical signals from a plurality of upstream locations at an optical power equalizer within the optical line termination; equalizing the plurality of optical signals from the plurality of upstream locations at the power equalizer, wherein the step of equalizing further includes: splitting off a portion of each of the plurality of optical signals; measuring an amplitude for each portion of the plurality of optical signals; and adapting each of said plurality of optical signals based on a corresponding, measured amplitude by either amplifying or attenuating each of the plurality of optical signals to generate equalized signals; and transmitting the equalized signals to a receiving unit within the optical line termination.

According to yet another exemplary embodiment a node for optical communications comprising: at least one port for receiving a plurality of optical signals; a light switching unit which couples the plurality of optical signals by switching between the plurality of optical signals into a sequentially combined signal onto an output fiber; and an interface for transmitting the combined signal.

According to yet another exemplary embodiment a node for equalizing optical signals comprising: a scheduler for receiving schedule information for each of a plurality of optical signals, wherein the schedule information includes at least timing and power information associated with the plurality of optical signals; and an adjuster for adjusting each of the plurality of optical signals by either amplifying or attenuating each of the plurality of optical signals based upon the schedule information.

According to yet another exemplary embodiment a node for optical communications comprising: an optical line termination for receiving a plurality of optical signals from a plurality of upstream locations at an optical power equalizer within the optical line termination; an optical equalizer for equalizing optical powers associated with the plurality of optical signals from the plurality of upstream locations, the optical equalizer including: at least one tapped coupler for splitting off a portion of each of the plurality of optical signals; and at least one sensor for measuring an amplitude of each portion of the plurality of optical signals; wherein each of the plurality of optical signals is adapted based on a corresponding, measured amplitude by either amplifying or attenuating each of the plurality of optical signals; and the equalized signals are transmitted to a receiving unit within the optical line termination.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

As mentioned above, it is desirable to provide mechanisms and methods that allow for reducing signal loss, improving signal strength in a passive optical network (PON), or both, albeit the present invention is not limited thereto as will be described below. As described above in the Background, a typical PON (be it a Gigabit-capable PON (GPON), broadband PON (BPON) or an Ethernet PON (EPON)) includes some type of splitter which is a source of transmission loss. Different passive power splitters (PPS) are commercially available today such as the fused biconical taper (FBT) splitter or the planar lightwave circuit (PLC) splitter. Technical approaches using either type of PPS can result in PONs with substantially the same transmission characteristics.

Figure 4:
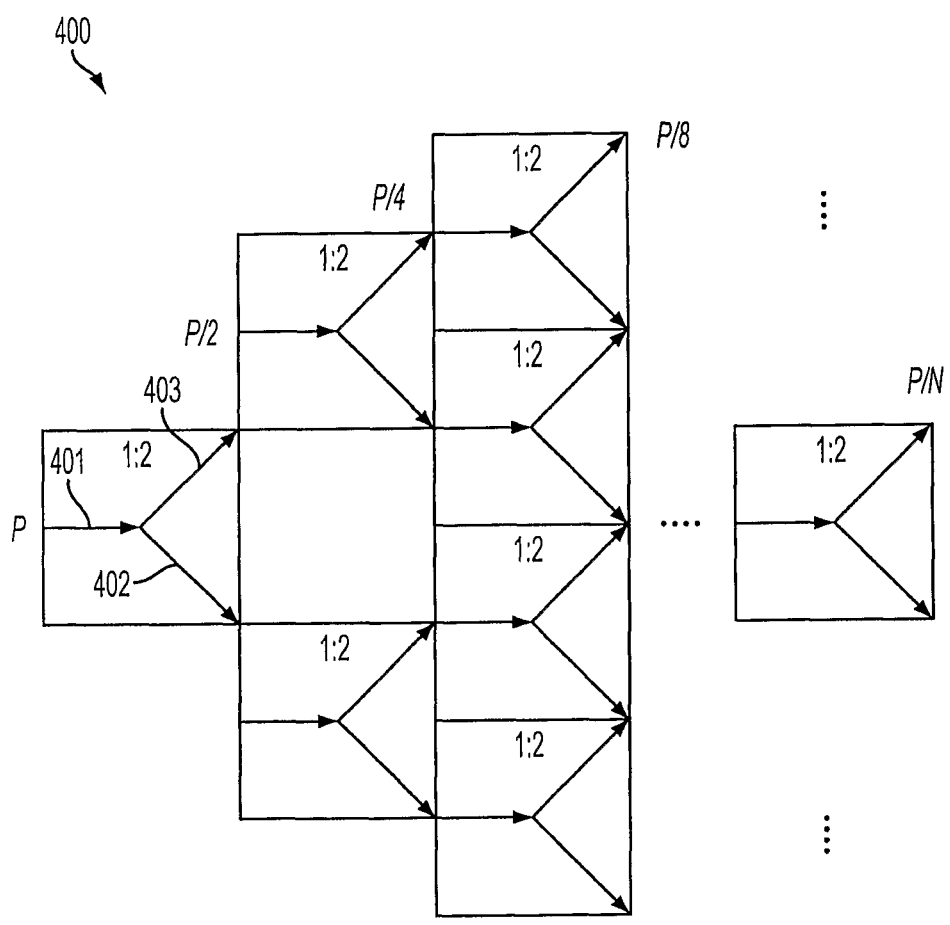
FIG. 4 shows a 1:N passive power splitter (PPS)

In a PON, an optical splitter typically divides the power equally among the signals in a 1:N ratio. FIG. 4 shows a 1:N PPS splitter 400 wherein an optical signal 401 enters the splitter and is output as two optical signals of equal strength 402 and 403. These two optical signals are then in turn split by presenting them to subsequent splitter ports, each time equally dividing the signal strength between two optical signals. As can be seen in FIG. 4, one signal becomes two signals, two signals become four signals and four signals become eight signals out to N signals. The theoretical insertion loss attributable to these splitters can be calculated by, for example, using the following equation:

$$\text{Loss} = -10 \log(N) \text{ dB} \quad (2)$$

This means that the loss increases by approximately 3 dB per doubling of splitter ports. Additionally, these PPSs 400 are passive (i.e., they do not increase the gain of the optical signal) and reciprocal which means that the PPS can be used in both directions (the PPS can act as a combiner) but with the same insertion loss. Thus in the case of a GPON using a PPS, light traveling from the ONT direction (upstream) to the OLT experiences the full insertion loss of $-10 \log(N)$ dB.

Pseudo-Passive Power Splitter

Figure 5:
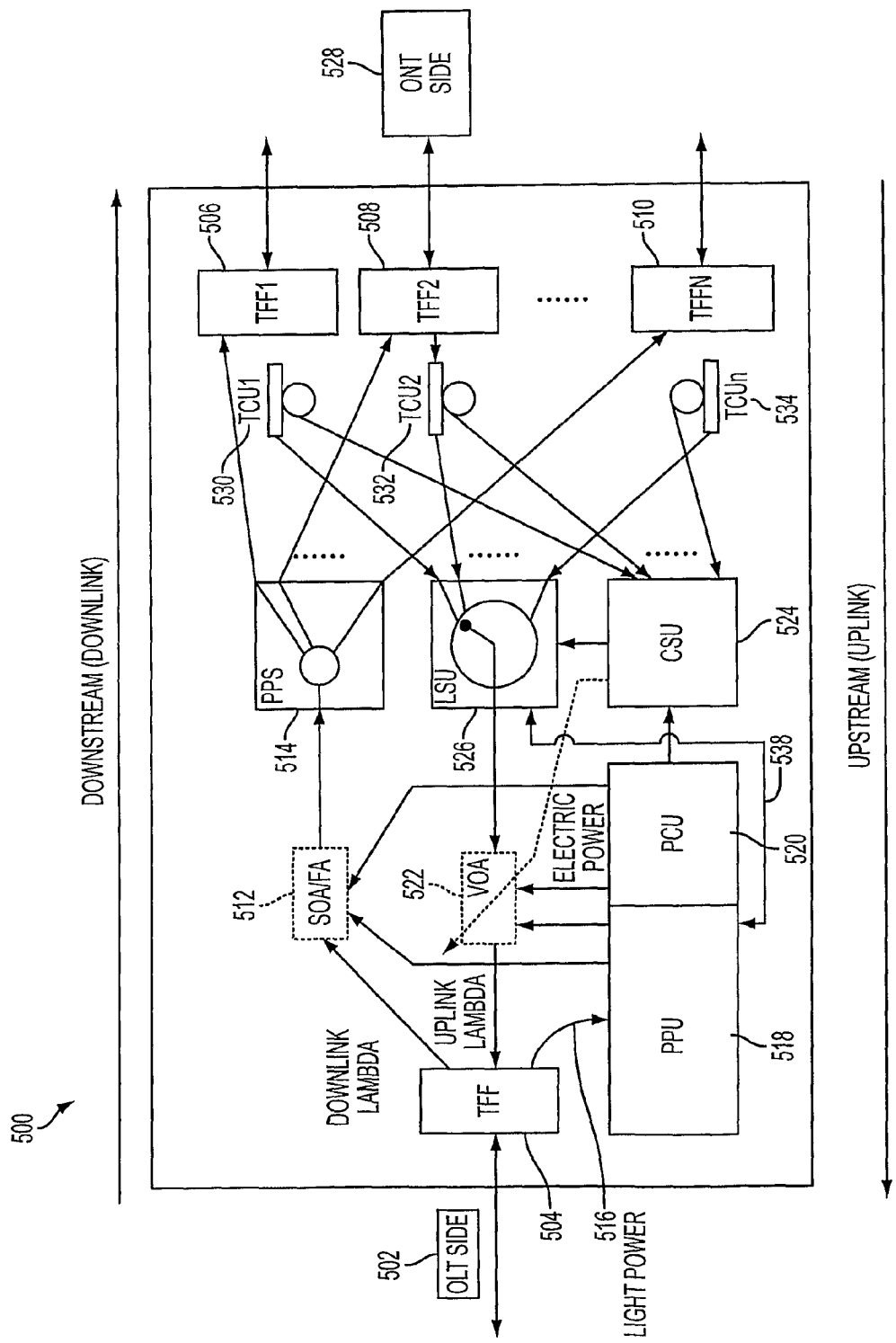
FIG. 5 depicts a pseudo-passive power splitter (PPPS) structure according to exemplary embodiments.

According to exemplary embodiments a pseudo-passive power splitter (PPPS) 500 structure as shown in FIG. 5 can be used to minimize splitter insertion loss, as well as to provide other benefits for improving usable optical signal strength distance within a PON. The PPPS 500 includes two optical data signal paths (upstream and downstream), a power path (light and electrical) and a control path. As shown by the arrows in FIG. 5, optical signals passing through the PPPS 500 from an OLT side 502 toward an ONT side 528 will be referred to herein as "downstream" or "downlink" optical signals. Conversely, optical signals passing through the PPPS 500 in the opposite direction (towards the OLT side 502) will be referred to herein as "upstream" or "uplink" optical signals. For signals entering or leaving the PPPS 500, regular wavelength multiplexers such as low loss thin-film filters (TFFs) 504 (upstream side), 506, 508 and 510 (downstream side) are used to separate/combine uplink, downlink and pump wavelengths as needed. Alternatively, instead of using a TFF 504, 506, 508 and 510 an arrayed wavelength grating (AWG) could be used. In the downstream path, optical signals are received from the OLT 502 side by TFF 504. TFF 504 can receive at least two downstream optical signals on two different wavelengths or wavelength ranges. One downstream optical signal includes the downstream data for the various ONTs which can be transmitted on one or more optical wavelengths reserved for data transmission, and the second downstream optical signal (which is light power 516) can be transmitted on a different wavelength, i.e., different from the downstream and upstream data wavelengths used by the PON. The downstream wavelength is then forwarded to an optional amplifier 512 (which could be, for example, either a semiconductor optical amplifier (SOA), a fiber amplifier, such as, a phosphorous doped fiber amplifier (PDFA) or a Raman amplifier) for amplification before the downstream optical signal, which is a high-rate continuous-wave signal, is split in a 1:N PPS 514.

If optional amplifier 512 is present and used, power needs to be provided to the optional amplifier 512. Light power 516 is forwarded from the TFF 504 to a power pump unit (PPU) 518. This light power 516 can be used in different ways to power different devices within the PPPS 500 as necessary. For example, if optional amplifier 512 is a PDFA or Raman amplifier, light power 516 can be pumped through power unit 518 to the PDFA optional amplifier 512 for power purposes. If optional amplifier 512 is an SOA, then light power 516 can be converted to electricity in power conversion unit (PCU) 520 and the electrical power is sent to the SOA optional amplifier 512 for use. The light power 516 can, for example, be converted into electricity via photovoltaic elements with a conversion efficiency up to approximately 80%. In most exemplary embodiments, depending upon the pump laser and the wavelength used, at least 1 W of electronic power can be generated from light transmitted over a standard single mode fiber with a reach of between 10 to 20 km.

Additionally other devices that may be within the PPPS 500 receive power from units 518 and 520 as needed. For example other amplifiers, such as a variable optical amplifier (VOA) 522 or a thorium doped fiber amplifier (TDFA) can receive either light power or electrical power depending upon what type of amplifier is used and electrical power is sent to the control and switching unit (CSU) 524. The exemplary embodiments described above with respect to powering the PPPS 500 shown in FIG. 5 can also be modified such that the light power is received from the ONT side 528 instead of the OLT 502 side. For example, in a system with 64 splits allowing for 64 ONTs, while one ONT is transmitting data, the other 63 ONTs can transmit light for power. This can be seen in FIG. 5, where light power 538 is being forwarded from LSU 526 to the PPU 518 for power purposes. As can be seen, the more allowable splits, the more ONTs, the higher the possible power received for use at the PPPS 500.

After optical amplification, if it occurs, at optional amplifier 512, the optical signal is sent on to the PPS 514. The PPS 514 splits the received optical signal into N signals for each of the N downstream side TFFs as shown by TFF1 506, TFF2 508 and TFFn 510. This optical signal splitting is typically performed in a manner as described above with respect to FIG. 4. These TFFs (506, 508 and 510) then forward the optical signals to their associated ONTs.

According to exemplary embodiments, the PPPS 500 is capable of acting as a combiner in the upstream direction. Optical signals are received from the 1 to N ONTs (represented by ONT side 528) associated with the GPON. These optical signals are received according to their predetermined time slots at their associated TFFs (TFF1 506, TFF2 508 and TFFn 510). From TFF1 506 a received optical signal is forwarded to its associated tapped coupler unit1 (TCU1) 530, with the TCU1 530 having, for example, a low tap ratio of approximately 1-5% of signal power. TCU1 530 sends the received optical signal to the light switching unit 526 and an on/off control signal to the control switching unit 524. The LSU 526 also receives optical signals from the other TCUs, e.g., TCU2 532 through TCUn 534. The CSU 524 also receives on/off control signals from the other TCUs, e.g., TCU2 532 through TCUn 534. From the received control signals, the control logic within the CSU 524 instructs the LSU 526 when to rotate mirrors (not shown in FIG. 5, described below) within it to receive the appropriate optical signal. In this manner the LSU 526 creates a combined signal in a substantially lossless manner for transmission upstream from all of the downstream ONTs. More details regarding the CSU 524 and the LSU 526 are provided below.

The combined signal is sent from the LSU 526 to an optional amplifier 522 (if present) such as a variable optical amplifier (VOA) for amplification. Alternatively, if power is a constraint or it is desirable to keep part of the system passive, a variable optical attenuator could be used in the place of optional amplifier 522. Additionally, depending upon the need and/or type of amplifier used as optional amplifier 522, equalization and/or attenuation can also be performed as also discussed in more detail below. To facilitate this amplification the optional amplifier 522 receives appropriate power as needed (in a manner similar to that described above for optional amplifier 512) and a control signal from the CSU 524 for setting up the desired attenuation. From the optional amplifier 522, the uplink wavelength is then sent to the TFF 504 for transmission upstream to the OLT side 502.

Figure 6A:
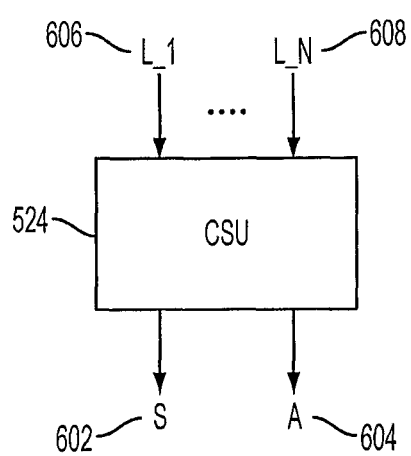
FIGS. 6(a)-(b) show signals associated with a control and switching unit (CSU) according to exemplary embodiments.
Figure 6B:
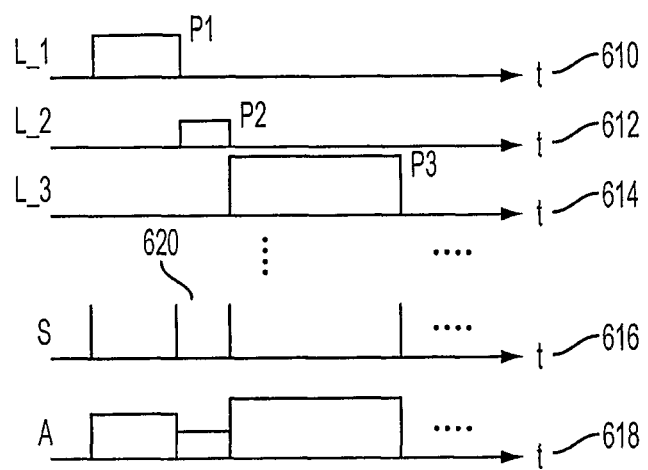

As described above, the operation of the CSU 524 and the LSU 526 aids in reducing the optical signal loss in the upstream direction. According to exemplary embodiments, the CSU 524 performs two tasks. Namely, the CSU 524 sends timing signals to the LSU 526 and control signals to the optional amplifier 522 (if present). The signals associated with CSU 524 according to an exemplary embodiment are illustrated in FIGS. 6(a)-(b) and include input signals from the TCUs 530, 532 and 534, an output signal S 602 and an output signal A 604. Input signals (also referred to herein as control on/off signals) are received from the various TCUs, for example, L_1 606 is received from TCU1 530 and L_N 608 is received from TCUn 534. These input signals include information regarding the timing relating to the different ONT transmission intervals and information about the transmission power of the received signals from the different ONTs. Examples of these input signals can be seen in signals 610, 612 and 614, where different power levels and time intervals are shown for each of the signals 610, 612 and 614.

Based on these received inputs, a timing signal S 602 is sent from CSU 524 to the LSU 526. The S signal 602 as shown in signal 616 shows a number of peaks. Each peak in signal 616 indicates to the LSU 526 to switch the light path for the next ONT signal to be received. For example, peak 620 could indicate to switch to the light path associated with the ONT signal coming from TCU2 508. The A signal 604 is used, for example, to set up the amplification (or attenuation depending upon whether an amplifier or an attenuator is used as optional amplifier 522) for optional amplifier 522 and includes timing and power levels associated with the combined optical signal that is transmitted upstream from LSU 526 as shown in signal 618.

Figure 7:
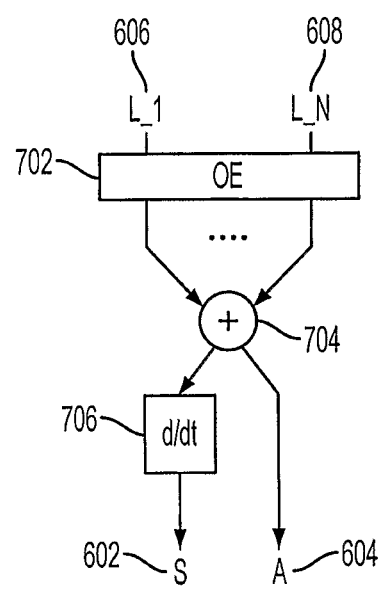
FIG. 7 shows functions applied to generate output signals from the CSU according to exemplary embodiments.

These exemplary signals can be further described using the diagram of the CSU 524 function as shown in FIG. 7. The optical input signals L_1 606 through L_N 608 are received at CSU 524 and undergo an optical to electrical conversion 702. These converted signals are sent for processing by a function generator 704 which generates the sum (performed in the electronic domain) and transmits the sum as two outputs. Output signal A 604 can be sent to the optional amplifier 522 without further processing, but the other output signal has a differentiation of the sum performed over time (d/dt) 706 prior to becoming output signal S 602 and transmitted to the LSU 526.

The timing involved with the received signals which leads to, e.g., the mirror switching within LSU 526 can, for example, be performed in accordance with the timing constants as described in G.984.1-4 for GPONs. For example, G984.2 specifies the physical overhead time (Tplo) that is precedent to any upstream burst. This overhead time is used for five physical processes in the GPON which are as follows: (1) laser on/off time, (2) timing drift tolerance, (3) level recovery, (4) clock recovery and (5) start of burst delimitation. Timing windows are specified for relevant upstream rates as shown below in Table 4.

TABLE 4

Time Windows for Upstream Rates

| Upstream Rate (Mbit/s) | Overhead Bytes (Bytes) | Corresponding Time |
|---|---|---|
| 1244.16 (actual) | 12 (96 bits) | 77 ns |
| 2488.43 (future) | 24 (192 bits) | 77 ns |

Figure 8:
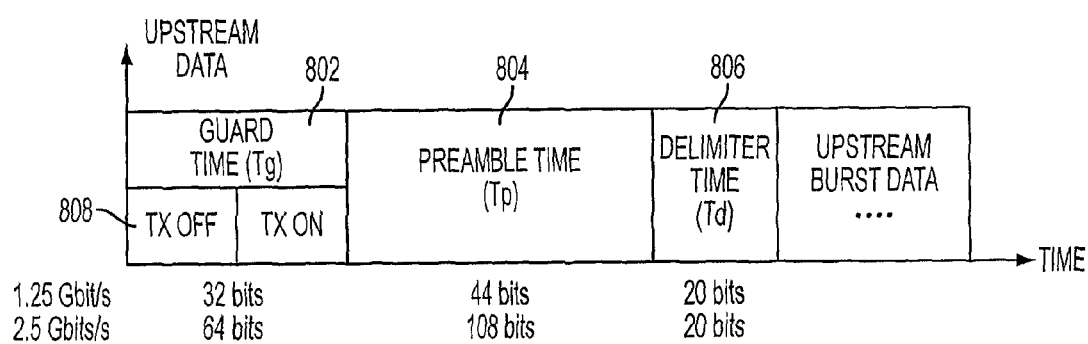
FIG. 8 illustrates an upstream timing diagram according to exemplary embodiments.

FIG. 8 shows an exemplary upstream timing diagram associated with upstream optical signals which can pass through PPPS 500. The upstream timing diagram illustrates the types of upstream data sent, the relative timing sequence and the number of bits allowed for each field of upstream data based upon the two different transmission rates. The guard time (Tg) 802 and the laser on/off times, account for 32 bits with a transmission rate of 1.25 Gbit/s and 64 bits for a transmission rate of 2.5 Gbit/s. The corresponding time, Tg 802, is currently 25.7 ns and, as such, the guard time Tg 802 is sufficiently long to allow the mirrors in the LSU 526 to be switched and for setting up the optional amplifier 522 (or optional optical attenuator). The guard time could be even longer depending upon optical system implementations. For example, adding reach extender boxes to the system would require extending the guard band to at least 72 bits which corresponds to a time of 57 ns. Moreover it can be seen from FIG. 8 that the minimum length of an upstream burst is given by a burst containing only physical layer overhead (PLOu) at a rate of 1.25 Gbit/s, which in total contains 44 bits of preamble, 20 bits of delimiter, 1 byte of interleaved parity (BIP), 1 byte of ONU-ID and 1 byte of status report. For a transmission rate of 2.5 Gbit/s the PLOu in total contains 108 bits of preamble, 20 bits of delimiter, 1 byte of interleaved parity (BIP), 1 byte of ONU-ID and 1 byte of status report. Converting this data block to a time reference, the minimum burst would thus last for 70.6 ns at a transmission rate of 1.25 Gbit/s and 61 ns at a transmission rate of 2.5 Gbit/s. Thus, at a minimum, the mirrors in the LSU 526 will remain in a single position without needing to be switched for 61 ns. This, in turn, means that the minimum period for the LSU 526 switching signal S 602 should be on the order of the sum of the time periods for Tg 802 plus the time associated with the PLOu, which is approximately 87 ns or 11.49 MHz. Therefore, according to exemplary embodiments, a CSU 524 should generate the S signal 602 and the A signal 604, e.g., at a rate greater than 11.49 MHz.

Figure 9B:
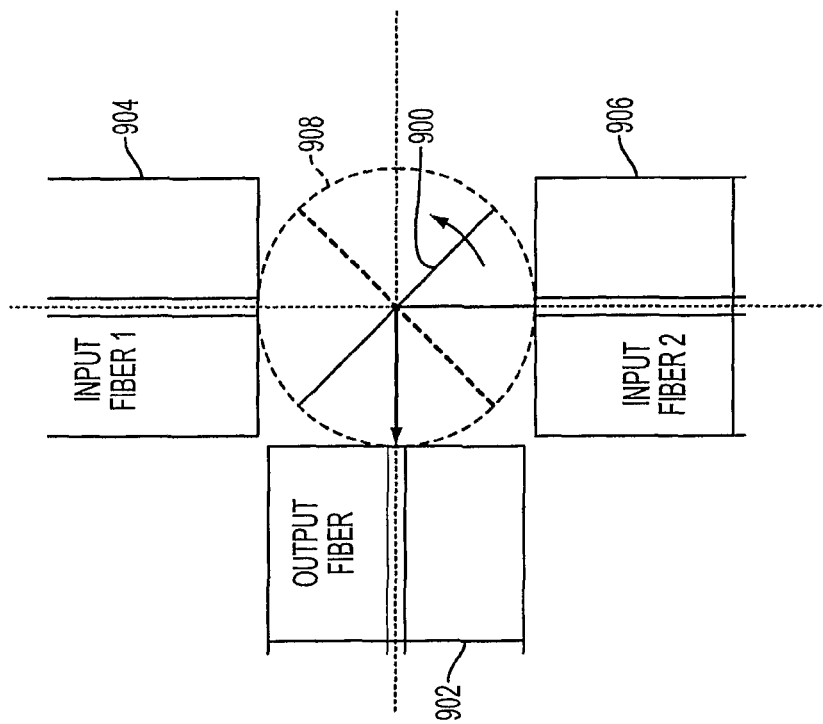
FIG. 9(b) shows a second light path in an LSU according to exemplary embodiments.
Figure 9A:
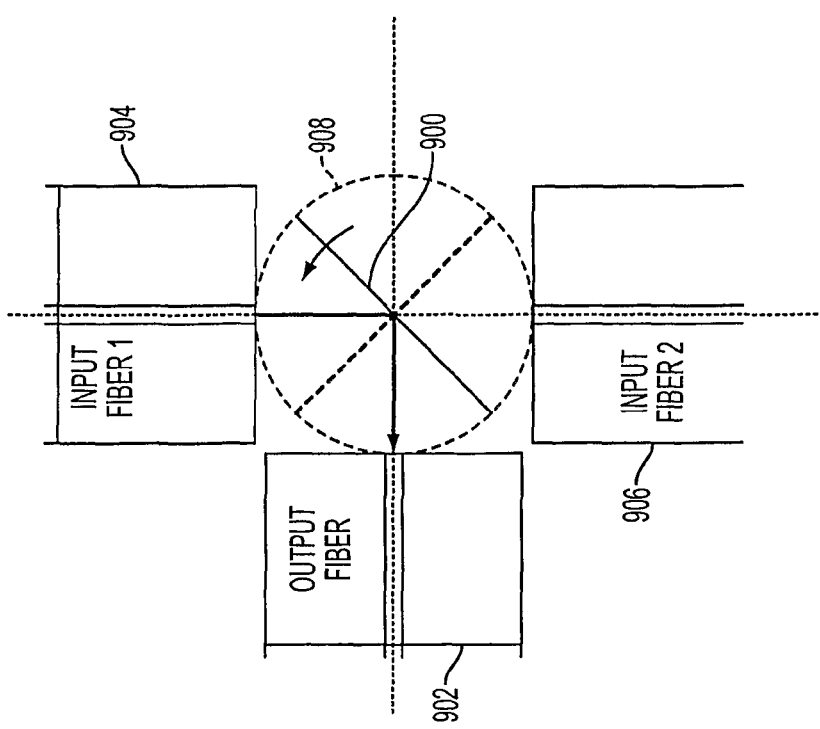
FIG. 9(a) illustrates a first light path in a light switching unit (LSU) according to exemplary embodiments.

Using the above described exemplary CSU 524 and associated signals and control logic, an exemplary LSU 526 will now be described. The LSU 526 can, for example, be implemented as a mechanical time-domain device that is non-reciprocal and thus allows for basically lossless switching of light paths. FIGS. 9(*a*)-9(*b*) show an exemplary 2:1 device where a rotating mirror 900 switches the light from different input fibers to the output fiber 902. Initially, in FIG. 9(*a*), light is coming in from input fiber1 904 and goes into the mirror unit 908 and is directed out to the output fiber 902. The signal from input fiber1 904 is then completed and mirror unit 908 changes its position, e.g., to the position indicated as a dashed line. This rotation of the mirror unit 908 can be performed in a step-wise manner during the ONT transmission windows, e.g., gap period (as shown by TX off time 808 in FIG. 8), under control of the CSU 524 through the S signal 602. At this time mirror unit 908 is ready to receive an optical signal from input fiber2 906. In FIG. 9(*b*) it can be seen that mirror unit 908 has been rotated, is now receiving an optical signal from input fiber2 906 and is directing that optical signal to the 5× the mode radius in the cladding, the dimension of the mirror can, for example, be approximately 36 μm. This size is well within the current capabilities of silicon fabrication techniques, e.g., where 0.9 μm sized items of technology can be placed on silicon today. According to one exemplary embodiment, a silicon chip style LSU 526 using optical MEMS mirrors will have an insertion loss of less than 1 dB and a switching time of, e.g., 25 ns. However, different combinations of switch time and loss can be used as desired, particularly when influenced by potential variables such as, cost, changes in upstream timing, changes to standards and ease of device manufacturing. Another exemplary switch technology which can be used to implement LSU 526 operates on the vertical coupler switch (VCS)/SOA principle and has a low switch time, e.g., under 1.5 ns, and a low loss, approximately 0 dB. The VCS/SOA principle can be generally described as dividing the wavepath in a vertically aligned resonator that is introducing an amplification. Thus, the signal split is compensated by a small amplification in the resonator. Still other switching techniques can also be used to implement LSU 526. For example, a variety of other optical space switch technologies, shown in Table 5 below, can be used to fabricate LSU 526 such as, electro-optical switches based on a Mach-Zehnder Interferometer (MZI), SOA or VCS as well as holographic switches, Micro-Electro-Mechanical System (MEMS) micro mirror devices called Optical MEMS (OMM) and electro-optical beam deflector technology can also perform the switching function in LSU 526.

TABLE 5

Optical Space Switches

| Ref. | Material | Principle | Switch Effect | I × O | Switch Time | Loss (dB) | Cross-talk (dB) | PDL (dB) | Power/Voltage |
|---|---|---|---|---|---|---|---|---|---|
| EO MZI | InP substrate/ bulk InGaAsP | MZI | EO | 4 × 4 | 200 ps | <6 (F-F) | <−13 | <1 | 4.5 V |
| DOS SOA VCS | InP substrate/ bulk InGaAsP | VCS/SOA | Carrier Injection | 4 × 4 | <1.5 ns | 0 (F-F) | −50 | | 5 V |
| DOS SOA VCS w/λ-conv | InP substrate/ bulk InGaAsP | VCS/SOA w/λ-conversion (at 10 Gbit/s) | Carrier injection and XGM | 4 × 4 | <1.5 ns | 0 (F-F) | −9 | | 5 V |
| EO Y-branch | PZT/PLZT/ (Nb:ST) substrate | Router-Selector architecture | EO | 8 × 8 | ~20 ns | ~5 | −40 | | 10 V |
| DOS SC Y-branch | InP/ InGaAsP | Router-Selector architecture by hybrid assembly | Carrier Injection | 8 × 8 | <100 ns | 25 | −13 | −3 | 340 mW |
| HOLOGR | KLTN crystal | Double-stage Electroholography | | 240 × 240 | 30 ns | ~4 | | | <300 W |
| EO Beam Deflectors | AlGaAs/ GaAs Ceramic substrate | Waveguide Array Deflectors (free space device) | EO phase modulation | 64 × 64 | <20 ns | ~15 | −19.5 | | | output fiber 902. While the LSU 526 shown in FIG. 9 is a 2:1 switching device, it should be understood that the LSU 526 can be more generally implemented as an N:1 switching device with N being a power of 2 and the N devices being used in a similar manner to that shown with respect to the splitters in FIG. 4.

Figure 1:
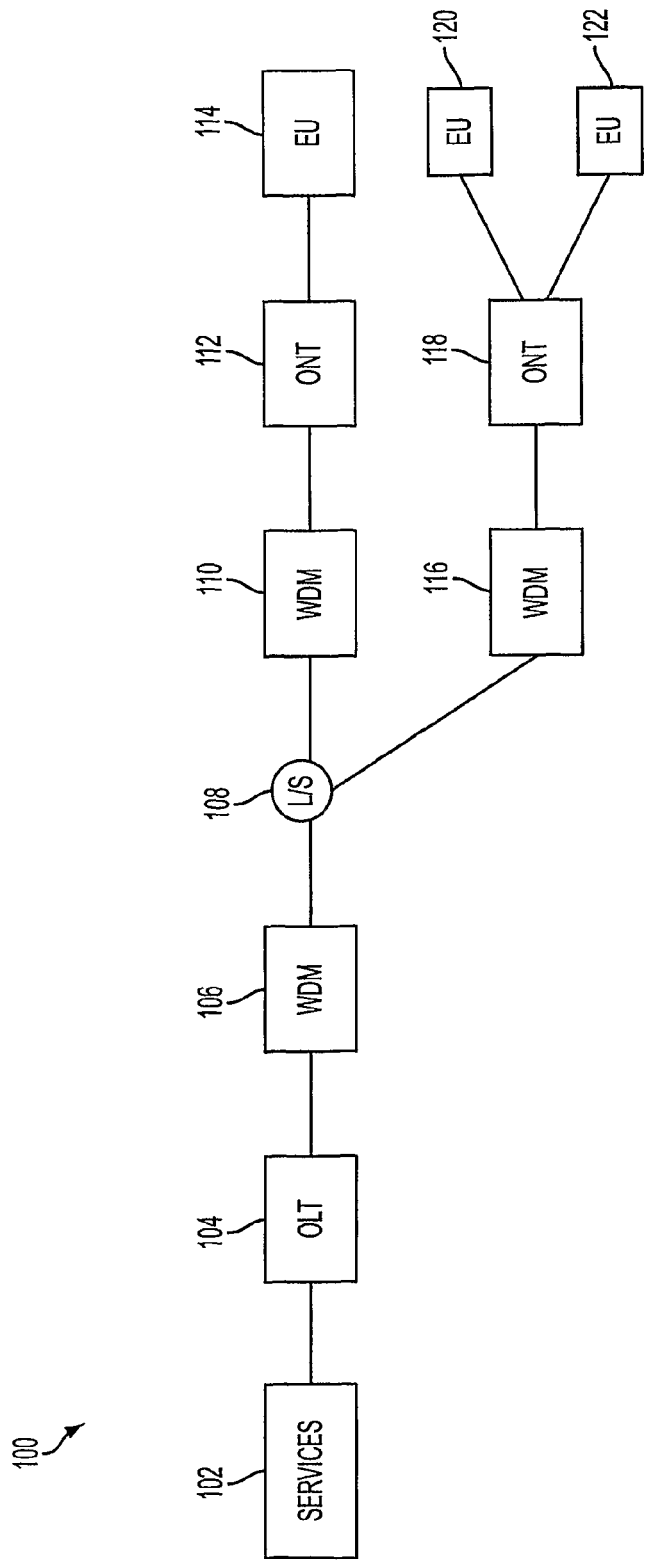
FIG. 1 depicts a Gigabit Passive Optical Network (GPON)
Figure 2:
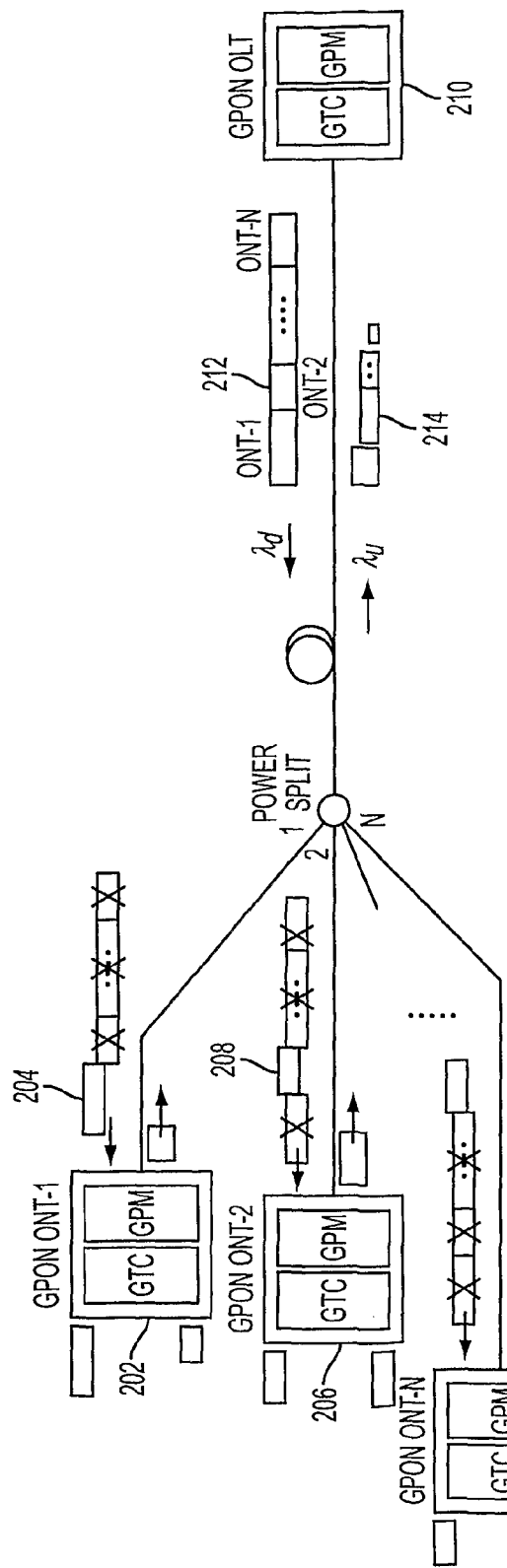
FIG. 2 illustrates Optical Network Terminations (ONTs) using a time division multiple access (TDMA) scheme.
Figure 3:
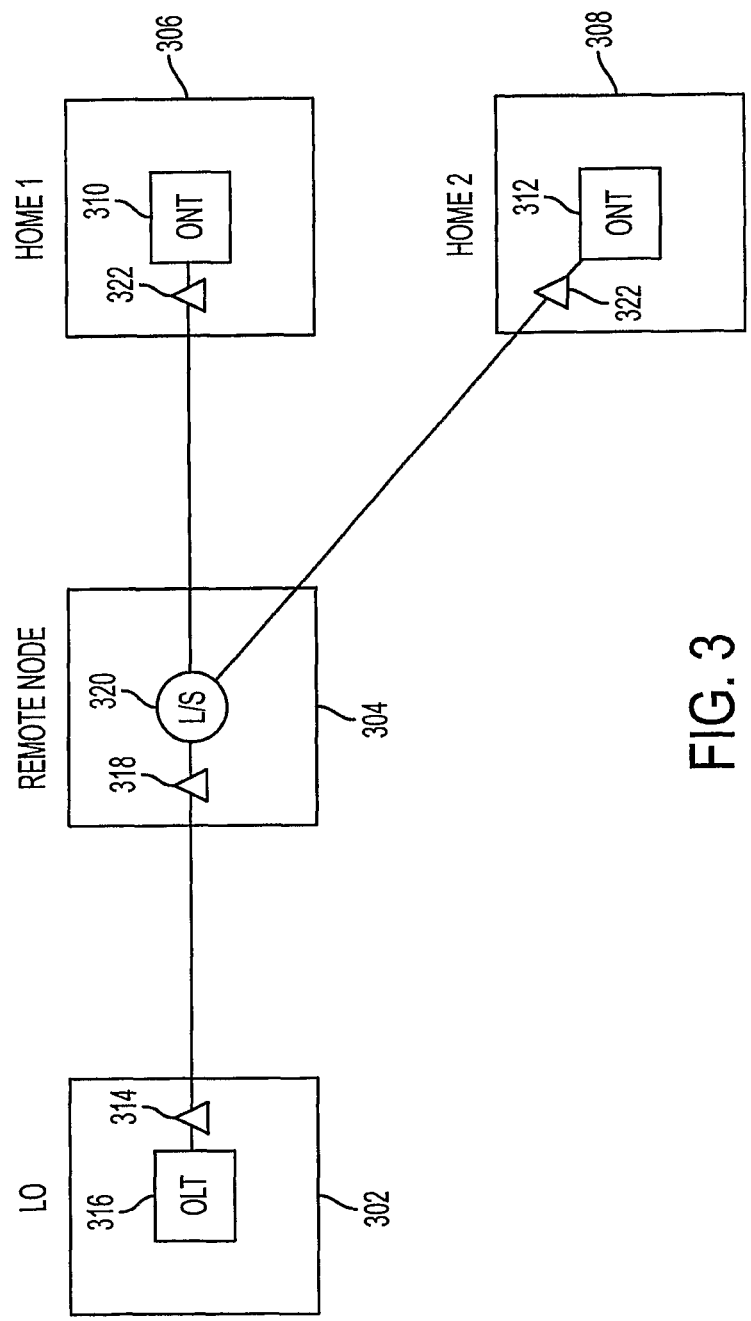
FIG. 3 illustrates potential booster placement options in a PON.
Figure 10:
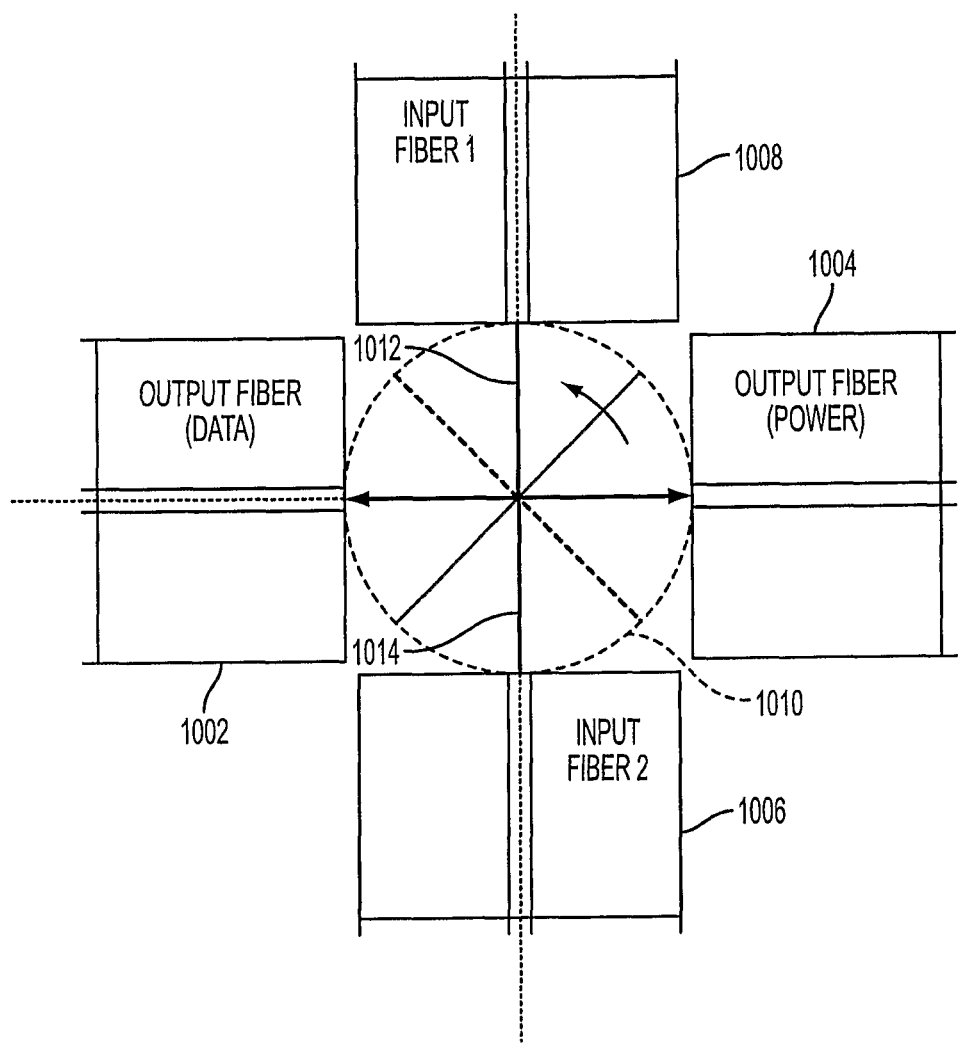
FIG. 10 illustrates receiving two light streams and their associated paths in an LSU according to exemplary embodiments.

For GPON uplinks, a time of, for example, 25 ns is available to flip/rotate the mirror in the LSU 526. With a mode diameter greater than, for example, 9.72 μm for single mode transmission and assuming 95% of the power is disposed in According to another exemplary embodiment, the LSU 526 can be powered by the lasers from the ONT side that are not currently transmitting an optical data signal. This exemplary feature will now be described with respect to FIG. 10. FIG. 10 shows an output fiber data 1002 that is currently receiving an optical signal 1012 from input fiber1 1008 based upon the mirror unit's 1010 current position. Input fiber2 1006 is receiving an optical signal 1010 from a first ONT which is being directed to output fiber power 1004. In a PON environment typically a single ONT is transmitting at a time as discussed above with respect to FIG. 2. However in this exemplary embodiment, the other ONTs' lasers are transmitting light for power on the same wavelength as the ONT which is transmitting data. The CSU 524 controls the mirror unit 1014 in LSU 526 such that the correct data is being received and the other received optical signal(s) are being forwarded to the correct destination, i.e., as light power 538 to the PPU 518. Additionally, the LSU 526 could receive power in a manner similar to that described above for the optional amplifier 522 or the CSU 524 as desired.

After the optical signal is combined in LSU 526, it is passed on to optional amplifier 522. Optional amplifier 522 is typically a variable optical amplifier (VOA) (or variable optical attenuator) which is used to amplify or attenuate signal amplitude as needed. The variance in amplitude typically occurs because different ONTs are located at different distances from the PPPS 500. A VOA 522 thus amplifies or attenuates the signals to have substantially similar amplitude based on the received control signal A 604 from CSU 524, prior to sending the optical signals on to TFF 504 for transmission to the OLT side 502. This use of a VOA 522 provides the further benefit of allowing the upstream OLT to use a fixed decision interval for determining whether a signal is valid or not, which can reduce the burst penalty.

According to another exemplary embodiment, PPPS 500 can act as a smart coupler and perform some of the tasks and functions traditionally performed by an OLT. For example, logic can be stored in a memory (not shown) within PPPS 500 which, in conjunction with processing capabilities, can perform such tasks as optical supervision, e.g., monitoring and reporting fiber damage and breaks, protocol termination allowing for interoperability between different PONs, as well as various security functions. Additionally, optical time domain reflectometry (OTDR) can be performed by this exemplary smart coupler to perform an improved mapping of the optical network which could provide better information for matching ONTs to their specific distances from the coupler. The memory and processing functions can be added to the PPPS 500 as separate entities, or they can be combined with the capabilities of the CSU 524.

It will be appreciated by those skilled in the art that, according to the above described exemplary embodiments, methods and systems for decreasing insertion loss in PONS have been presented. This reduction in insertion loss can be used to provide a greater reach for optical signals in a PON. Alternatively, or in conjunction with an increase in signal reach in a PON, this decrease in insertion loss can provide the opportunity to increase the number of splits in the PON from, e.g., a typical number of splits used in today's GPONs, e.g., 64, to a much larger number of splits, e.g., 512, 1024, 2048 or more, depending upon desired reach and the actual insertion loss reduction obtained for a particular implementation. The following discussion of power equalizers provides other exemplary techniques for reducing insertion loss in a PON.

Power Equalizer

As described above, inserting a PPPS 500 into a PON can reduce optical signal loss and increase optical signal reach. As mentioned in the Background, another alternative to increasing signal reach is to amplify the signal in such a way as to avoid some of the problems associated with boosters. Accordingly, other exemplary embodiments include using a power equalizer (PE) in a PON. According to different exemplary embodiments, different types of power equalizers can be placed in different locations within a PON to increase optical signal reach as will be described below.

Power equalizers can generally be described as devices that equalize optical signals through amplitude adjustment typically by applying gain or attenuation. These power equalizers typically receive power from a power source to perform these adjustments and also typically receive information regarding the optical signals in order to make those adjustments. One example of a power equalizer is described in the Lee et al. patent application publication number US 2004/0247246 A1 filed on Oct. 23, 2003, the disclosure of which is incorporated herein by reference. In the Lee et al. (hereinafter "Lee") publication, a power equalizer is placed between the passive optical splitter and the OLT in a PON. One example of a power equalizer described in Lee uses an SOA in conjunction with an active gain control circuit and a delay element which modifies the optical signal based upon incoming measured optical signal amplitudes. While the power equalizer of Lee modifies signal strength based upon received determined amplitudes, other types of power equalizers (as well as other placement locations for optical power equalizers within a system) potentially offer other benefits of interest in PONs as will be described below.

PEs of particular interest according to these exemplary embodiments can be broken down into the two general categories herein: adaptive or scheduled. In an adaptive type of PE, the modifications to the received optical signals are based upon measurements of the amplitudes of the received optical signals. One method for determining the received optical signal power is to split out (tap) a small portion of the received optical power to a PIN diode (a diode with an undoped semiconductor region between a p-type and an n-type semiconductor region) for measurement. Additionally, in an adaptive type of PE, a processing delay often needs to be accounted for while the system determines the amplitude from the tapped signal and adjusts the PE accordingly to equalize the received optical signals. Also by comparison, an adaptive type of PE tends to be fast, or react quickly, while a scheduled type of PE can be slower and tends to be less costly than an adaptive type of PE.

In a scheduled type of PE according to exemplary embodiments, a system scheduler is in communication with the PE. The system scheduler knows when signals from the various ONTs are received by the OLT and knows at what the optical power(s) the upstream ONTs are transmitting. The system scheduler gains this knowledge during a "ranging procedure" which occurs during ONT start-up. This knowledge allows the scheduler to adjust the PE in time for the arrival of a new ONT signal.

Regarding the ranging procedure, the main purpose of the ranging procedure is for the ONT to synchronize its time relative the OLT by measuring the round-trip delay. The OLT knows the (newly installed) ONT signal power from the first signal sent, (regardless of message type), by measuring the average optical power the same way two end-point devices on a point-to-point system, which do not practice ranging, know their respective signal powers. In our exemplary PON, the first signal from the ONT is part of the ranging process. So the OLT scheduler knows how much each ONT signal should be attenuated for all of them to have the same, or substantially the same, power level after processing by the PE. Also, the OLT scheduler determines the subsequent data communications scheduling after the ranging, and has thus all information on the time when each signal from the ONTs arrive at the OLT.

Within these two general types of PEs, i.e., adaptive and scheduled, two sub categories can be defined: those which apply gain to the received optical signals and those which do not. This allows PEs to be classified into four types as shown below in Table 7. Additionally, an example of different types of techniques/technology which can be used to implement each type of PE is shown in Table 7, however these examples are not intended to be exhaustive.

TABLE 7

Sample PE Matrix

| | Without Gain | With Gain |
|---|---|---|
| Adaptive | Optical modulator with power monitor | Gain saturated SOA |
| Scheduled | Micro-mechanical optical attenuator | Parametric (Kerr effect) amplification with variable pump laser |

These four types of PEs allow for different methods of improving optical signal reach, e.g., in the upstream direction, by placing them in a PON. Additionally options exist as to where in a PON to place a power equalizer, which further increases a PE's flexibility as will be described below.

Figure 11:
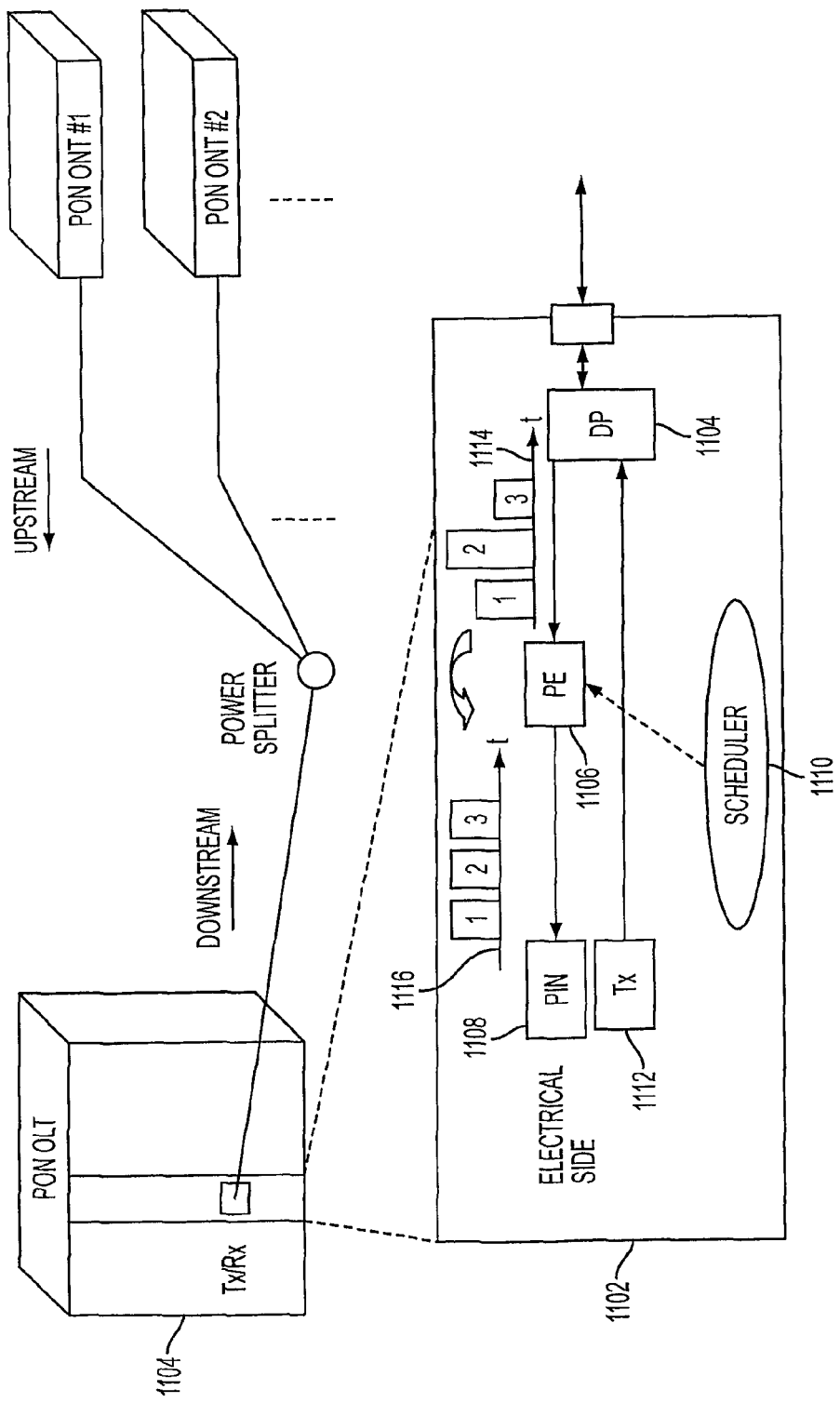
FIG. 11 shows a power equalizer (PE) in an OLT according to exemplary embodiments.

According to exemplary embodiments any of the different types of PEs described above can be located in an OTRx card 1102 within an OLT chassis 1104 as illustrated in FIG. 11. The signal from the ONTs is received by OTRx card 1102 and initially is passed to a diplexer filter (DP) 1104 disposed thereon. Signals are separated and sent to the PE 1106 which performs equalization as previously described. PE 1106 then forwards the equalized signal to the PIN 1108 which performs the optical to electrical conversion. If the PE 1106 is of the scheduled type, as shown in FIG. 11, system scheduler 1110 will control PE 1106. If the PE 1106 is an adaptive type of PE, the other desired components, e.g., a gain control circuit and delay element, while not shown in FIG. 11 will be present as needed. Alternatively, some components could be combined such as the PIN 1108 and the transmitter (Tx) 1112. Additionally, signals 1114 and 1116 illustrate relative optical strengths for signals from the ONTs before equalization and after equalization, respectively.

Figure 12:
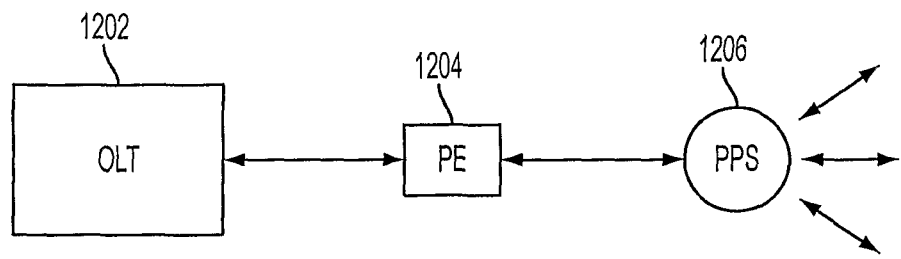
FIG. 12 shows a PE remotely located between an OLT and passive power splitter.

According to other exemplary embodiments, the PE 1204 can be located separately from the OLT 1202, e.g., in its own location between the OLT 1202 and a PPS 1206 as shown in FIG. 12. In these exemplary embodiments, each of the four general types of PEs 1206, as shown in Table 7 above, could be the PE 1206 of choice depending upon factors related to the PON in which the PE would be placed. For example, considering the case of a scheduled, passive PE a system designer could consider the following operational characteristics and match them to other factors influencing a PON design such as length and cost. Firstly the scheduled, passive PE can be slower to set a new equalization (attenuation) level, as the scheduler adds control (overhead) signaling in advance before each new signal arrives, and the scheduled, passive PE can therefore be less advanced and therefore less costly than an adaptive/gain device. Secondly, the scheduled, passive PE can be much wider in operating wavelength meaning that the whole spectrum of the fiber can be available for use. Thus it can be used to support other future growth, e.g., different wavelengths and multi-signals. Thirdly, the scheduled, passive PE has no limitation in bitrates as typical SOAs currently do. And fourthly, in the case of multi-wavelength signals, the passive device would not impose cross talk between the signals as a SOA may do.

Additionally, other devices can be either part of the PE 1204 or in close communication with PE 1204. For example, power may need to be supplied to PE 1204. If PE 1204 is an adaptive PE 1204, then a gain control circuit and delay element may be included. If the PE 1204 is a scheduled PE, then a mechanism for communicating the timing schedule and ONT output powers to the PE 1204 can be included. This latter mechanism could be implemented in a variety of ways such as, for example, providing the PE 1204 the ability to snoop the scheduling information from optical signals containing the so-called bandwidth map (i.e. the information to the ONTs from the OLT scheduler on when the ONTs can send their next frame of information) between OLT 1202 and the ONTs active in the PON as well as memory to store the information.

According to another exemplary embodiment a power equalizer can be placed in PPPS 500 in place of optional amplifier 522. More specifically, the PEs with gain can provide additional benefits by being placed closer to the ONTs, e.g., as the noise is inversely proportional to the signal power, having higher input signal powers to the gain-element as would be the case closer to the ONTs, adds less noise to the signal. This applies for both the adaptive gain PE, e.g., a gain saturated SOA, and for the scheduled gain PE, e.g., a parametric (Kerr effect) amplification with variable pump laser. For the gain saturated PE to replace the optional amplifier 522 few or no changes would be needed to the above-described exemplary PPPS 500 because the output power is fixed and the ability to power the gain saturated PE in the PPPS 500 is already present as previously described for powering an optional amplifier 522. For the parametric amplification with variable pump laser minimal changes associated with controlling the PE would be made to the PPPS 500. For example, the schedule information regarding ONT timing and output power information needs to be obtained by the PPPS 500 to appropriately control the PE. This could happen by, for example, giving the PPPS 500 the ability to snoop the information regarding upstream bandwidth allocation (bandwidth map), which the OLT sends downstream within each frame. This would allow a PPPS 500 with a scheduled PE to amplify/attenuate signals as needed in a manner similar to that described above where the PE is located within the OLT and is in communications with a system scheduler. Alternatively this information could be transmitted to the PPPS 500 by the OLT. Using a scheduled PE in PPPS 500 could provide various benefits, such as, reducing/removing the need to have the TCUs (530, 532 and 534) present (since the need to tap the signal and determine incoming signal strength no longer exists). The control signals S 602 and A 604 from CSU 524 would then be determined based upon information received by snooping or information directly transmitted to the PPPS 500 from the OLT scheduler 1110.

Note that in some exemplary embodiments, e.g., wherein the PE is placed in an OLT, the power equalizer does not have or use an external coupler since the PE 1106 is placed within the OLT 1104 as shown in FIG. 11. Also, for the scheduled PEs in either the OLT 1104 or the PPPS 500, the need for a delay line is removed since the different signal levels from the ONTs are known ahead of time which allows for the appropriate control signals to be sent to the PE in time to plan and execute the equalization action.

Additional benefits can accrue by using a PE in certain circumstances. For example, a PE can improve receiver sensitivity by reducing or eliminating the need for complex electronics in the receiver, which can reduce receiver sensitivity typically by 3 dB or more, to handle the varying optical power levels particularly in high bit rate applications. This increased sensitivity enables longer reach in the upstream direction which is normally the limiting direction. Additionally, when the PE includes a gain function overall system reach can be further increased.

Figure 13:
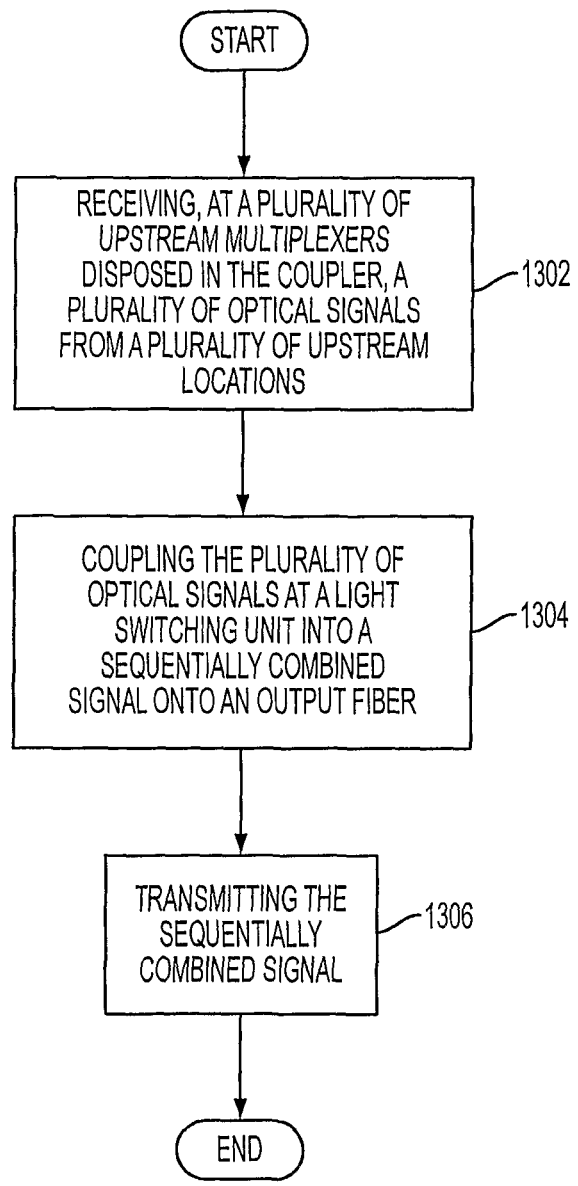
FIG. 13 shows a method flowchart for increasing signal reach according to exemplary embodiments.

Utilizing the above-described exemplary systems according to exemplary embodiments, a method for increasing signal reach is shown in the flowchart of FIG. 13. Initially a method for increasing signal reach using a coupler in a fiber optic communications network includes the steps of: receiving, at a plurality of upstream multiplexers disposed in the coupler, a plurality of optical signals from a plurality of upstream locations at step 1302; coupling the plurality of optical signals at a light switching unit into a sequentially combined signal onto an output fiber at step 1304; and transmitting the combined signal at step 1306.

Figure 14:
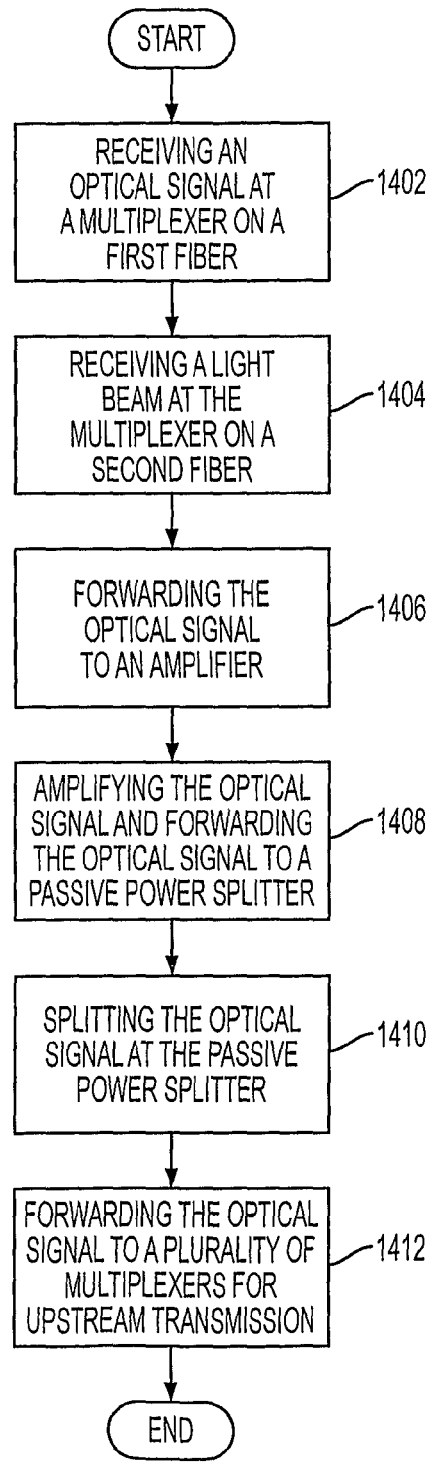
FIG. 14 shows a method flowchart for reducing signal loss according to exemplary embodiments.

Utilizing the above-described exemplary systems according to exemplary embodiments, a method for reducing signal loss is shown in the flowchart of FIG. 14. Initially a method for reducing signal loss in a coupler in a fiber optic communications network includes the steps of receiving an optical signal at a multiplexer on a first fiber at step 1402; receiving a light beam at the multiplexer on a second fiber at step 1404; forwarding the optical signal to an amplifier at step 1406; amplifying the optical signal and forwarding the optical signal to a passive power splitter at step 1408; splitting the optical signal at the passive power splitter at step 1410; and forwarding the optical signal to a plurality of multiplexers for upstream transmission at step 1412.

Figure 15:
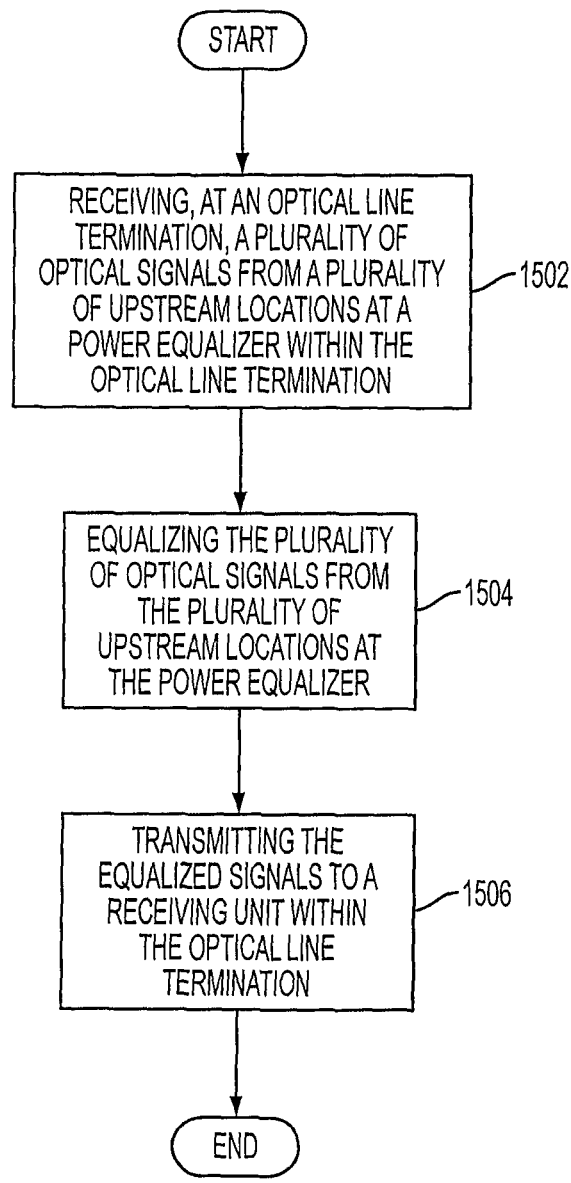
FIG. 15 depicts a method flowchart for increasing transmission distance according to exemplary embodiments.

Utilizing the above-described exemplary systems according to exemplary embodiments, a method for increasing transmission distance is shown in the flowchart of FIG. 15. Initially a method for increasing transmission distance in a fiber optic communications network includes the steps of receiving, at an optical line termination, a plurality of optical signals from a plurality of upstream locations at a power equalizer within the optical line termination at step 1502; equalizing the plurality of optical signals from the plurality of upstream locations at the power equalizer at step 1504; and transmitting the equalized signals to a receiving unit within the optical line termination at step 1506.

Figure 16:
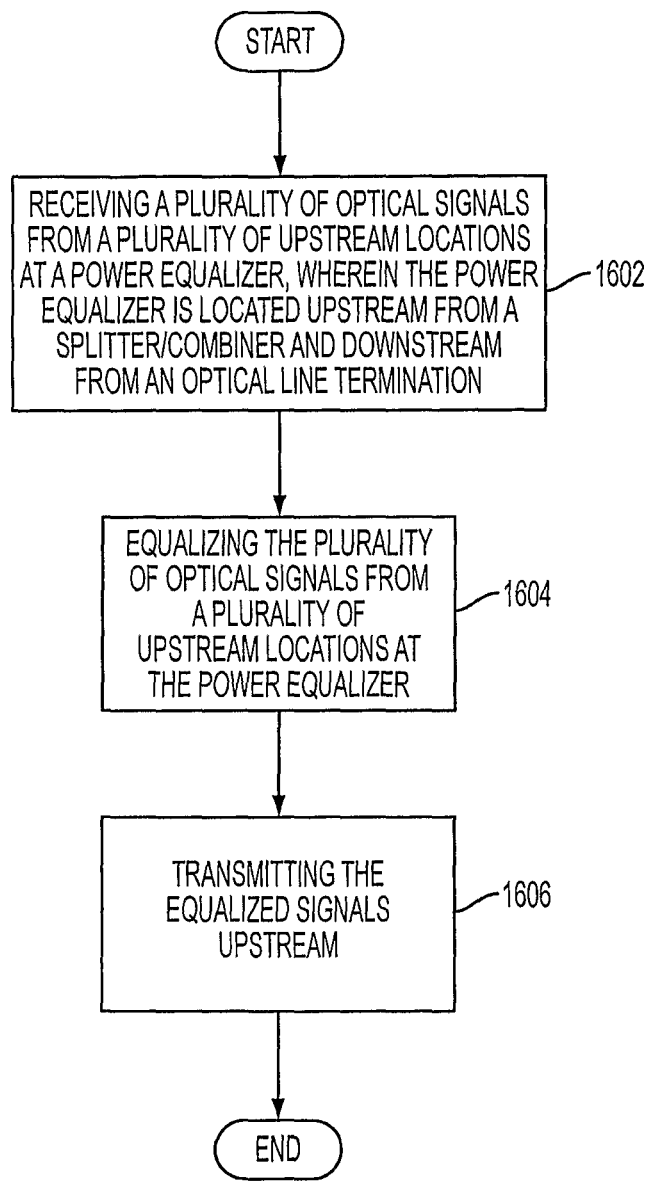
FIG. 16 shows a method flowchart for increasing transmission distance according to exemplary embodiments.

Utilizing the above-described exemplary systems according to exemplary embodiments, a method for increasing transmission distance is shown in the flowchart of FIG. 16. Initially a method for increasing transmission distance in a fiber optic communications network includes the steps of: receiving a plurality of optical signals from a plurality of upstream locations at a power equalizer, wherein the power equalizer is located upstream from a splitter/combiner and downstream from an optical line termination at step 1602; equalizing the plurality of optical signals from a plurality of upstream locations at the power equalizer at step 1604; and transmitting the equalized signals upstream at step 1606.

Figure 17:
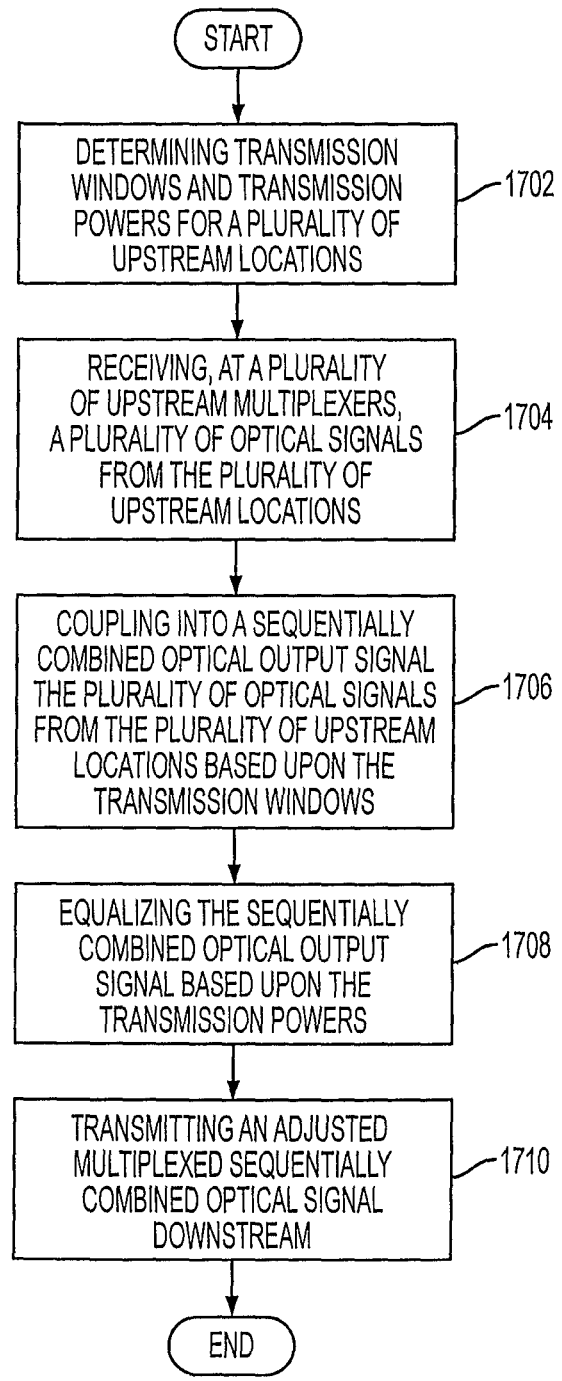
FIG. 17 depicts a method flowchart for increasing optical signal range according to exemplary embodiments.

Utilizing the above-described exemplary systems according to exemplary embodiments, a method for increasing optical signal range is shown in the flowchart of FIG. 17. Initially a method for increasing optical signal range in a fiber optics communications network includes the steps of determining transmission windows and transmission powers for a plurality of upstream locations at step 1702; receiving, at a plurality of upstream multiplexers, a plurality of optical signals from the plurality of upstream locations at step 1704; coupling into a sequentially combined optical output signal the plurality of optical signals from the plurality of upstream locations based upon the transmission windows at step 1706; equalizing the sequentially combined optical output signal based upon the transmission powers at step 1708; and transmitting an adjusted multiplexed sequentially combined optical signal downstream at step 1710.

The above-described exemplary embodiments are intended to be illustrative in all respects, rather than restrictive, of the present invention. All such variations and modifications are considered to be within the scope and spirit of the present invention as defined by the following claims. For example, if these improvements to optical signal reach in the upstream direction make the downstream direction to now have the shorter reach, various parts of the above described exemplary embodiments could be used in the downstream direction. No element, act, or instruction used in the description of the present application should be construed as critical or essential to the invention unless explicitly described as such. Also, as used herein, the article "a" is intended to include one or more items.

What is claimed is:

1. A method for equalizing optical signals comprising the steps of:
   receiving a plurality of upstream optical signals in a passive optical network (PON), each of said plurality of optical signals comprising a PON burst frame transmitted from a different downstream transmitter;
   receiving schedule information for each of said plurality of optical signals from a system scheduler, wherein said schedule information includes at least timing and power information associated with said plurality of optical signals; and
   adjusting each of said plurality of optical signals by either amplifying or attenuating each of said plurality of optical signals based upon said schedule information to mitigate non-uniform signal powers of said PON burst frames.

2. The method of claim 1, wherein said adjusting step is performed using a micro-mechanical optical attenuator, wherein a scheduler adjusts said micro-mechanical optical attenuator based upon a known strength of a next to be received optical signal from said plurality of optical signals.

3. The method of claim 1, wherein said adjusting step is performed using parametric amplification with a variable pump laser, wherein a scheduler adjusts said parametric amplification with a variable pump laser based upon a known strength of a next to be received optical signal from said plurality of optical signals.

4. The method of claim 1, wherein said step of adjusting is performed at a location other than at an optical line termination or a coupler/splitter in an optical communication system.

5. A node for equalizing optical signals comprising:
   an input port for receiving a plurality of upstream optical signals, each of said plurality of optical signals comprising a PON burst frame transmitted from a different downstream transmitter;
   a scheduled power equalizer configured for receiving schedule information for each of said plurality of optical signals from a system scheduler, wherein said schedule information includes at least timing and power information associated with said plurality of optical signals, and
   an adjuster for adjusting each of said plurality of optical signals by either amplifying or attenuating each of said plurality of optical signals based upon said schedule information to mitigate non-uniform signal powers of said PON burst frames.

6. The node of claim 5, wherein said adjuster further comprises a micro-mechanical optical attenuator, and further wherein said micro-mechanical optical attenuator is adjusted based upon a known strength of a next to be received optical signal from said plurality of optical signals.

7. The node of claim 5, wherein said adjuster further comprises a parametric amplification device with a variable pump laser, wherein said said parametric amplification is adjusted with said variable pump laser based upon a known strength of a next to be received optical signal from said plurality of optical signals.

8. The node of claim 5, wherein said node is disposed at a location other than at an optical line termination or a coupler/splitter in an optical communication system.

* * * * *